United States Patent

[11] 3,607,105

[72] Inventors George Reid
Olympia Fields;
William R. Watson, Oak Lawn, both of, Ill.
[21] Appl. No. 852,358
[22] Filed Aug. 22, 1969
[45] Patented Sept. 21, 1971
[73] Assignee Nalco Chemical Company
Chicago, Ill.

[54] AUTOMATIC SOLVENT ASPIRATED POWDER FEEDER-DISSOLVER
4 Claims, 1 Drawing Fig.

[52] U.S. Cl. .................................................. 23/267 R,
23/271, 23/312 A, 210/138, 260/705, 260/29.2,
222/193, 137/604, 302/14
[51] Int. Cl. ...................................................... B01f 1/00
[50] Field of Search ............................................ B01f/5/04;
23/267 R, 271, 272.6 R, 309, 312 A; 210/138;
260/29.2, 705; 302/14, 15, 16, 17, 21, 58; 137/3,
604

[56] References Cited
UNITED STATES PATENTS

| | | | |
|---|---|---|---|
| 871,300 | 11/1907 | Schwarz | 23/271 X |
| 966,389 | 8/1910 | Durant | 23/271 X |
| 1,792,003 | 2/1931 | Dickey | 23/271 X |
| 2,501,467 | 3/1950 | Ittner | 23/271 X |
| 2,573,949 | 11/1951 | Blizzard | 23/271 X |
| 2,975,038 | 3/1961 | Lott | 23/271 X |
| 3,129,064 | 4/1964 | Harvey | 23/271 X |
| 3,289,842 | 12/1966 | Richards | 23/271 X |
| 3,322,507 | 5/1967 | Smith | 23/271 X |
| 3,359,073 | 12/1967 | Scanley | 23/312 A |
| 3,456,801 | 7/1969 | Bowles | 23/274 |
| 3,468,322 | 9/1969 | Katzer | 23/312 A |

FOREIGN PATENTS

| | | | |
|---|---|---|---|
| 26,152 | 0/1908 | Great Britain | 23/271 |
| 192,652 | 0/1964 | Sweden | 23/271 |
| 369,378 | 0/1907 | France | 23/271 |

Primary Examiner—Norman Yudkoff
Assistant Examiner—S. J. Emery
Attorneys—John G. Premo, Charles W. Connors and Edward A. Petacek ABSTRACT: A method for dissolving chemical powders in water to make lump-free solutions is afforded by this invention. The invention provides a method and an apparatus whereby water solutions of chemical powders can be easily formed. The method used to accomplish these results consists of the following:
  1. Supplying a quantity of water to water supply port.
  2. Feeding chemical powders through an outlet and into the water supply port, said water supply port having a supply assembly and a suction assembly fitted with aspirators to prevent backsplash and to draw the chemical powder into the water through the water supply port.
  3. Mixing the chemical powders in the water in the water supply port to form a premixed slurry.
  4. Discharging the premixed slurry into a mixing tank.
  5. Filling a mixing tank and actuating a mixing means and a timer when the tank is filled to form a chemical solution.
  6. Transferring the mixed solution to a storage tank by means of a transfer pump.
  Pumping the chemical solution from the storage tank through a discharge.

The apparatus used to accomplish the above method comprises:
  1. A feeding chamber having an outlet.
  2. A water supply port, comprising:
    A. a suction assembly having ends,
    B. a supply assembly having ends,
    C. two aspirators adapted to fit said ends of said suction assembly and the supply assembly,
    D. an automatic valve positioned in the supply assembly, and
    E. a delayed actuated automatic valve positioned between the suction assembly and the supply assembly.
  3. A mixing tank capable of holding a chemical solution, comprising:
    A. a mixing means for the tank,
    B. an upper liquid level sensing means to close the automatic valve and the delayed actuated automatic valve,
    C. a lower liquid level sensing means to open said automatic valve and said delayed actuated automatic valve,
    D. an inlet adapted to receive said aspirator of said supply assembly of said water supply port, and
    E. an outlet.
  4. A transfer pump adapted to remove said chemical solution from said mixing tank through the outlet and deenergized by said lower liquid level sensing means of the mixing tank.
  5. A storage tank adapted to receive the chemical solution from the transfer pump having a lower liquid level sensing means to actuate said transfer pump and having an outlet.
  6. A metering pump being deenergized manually, and having an outlet for discharge of the chemcial solution.

3,607,105
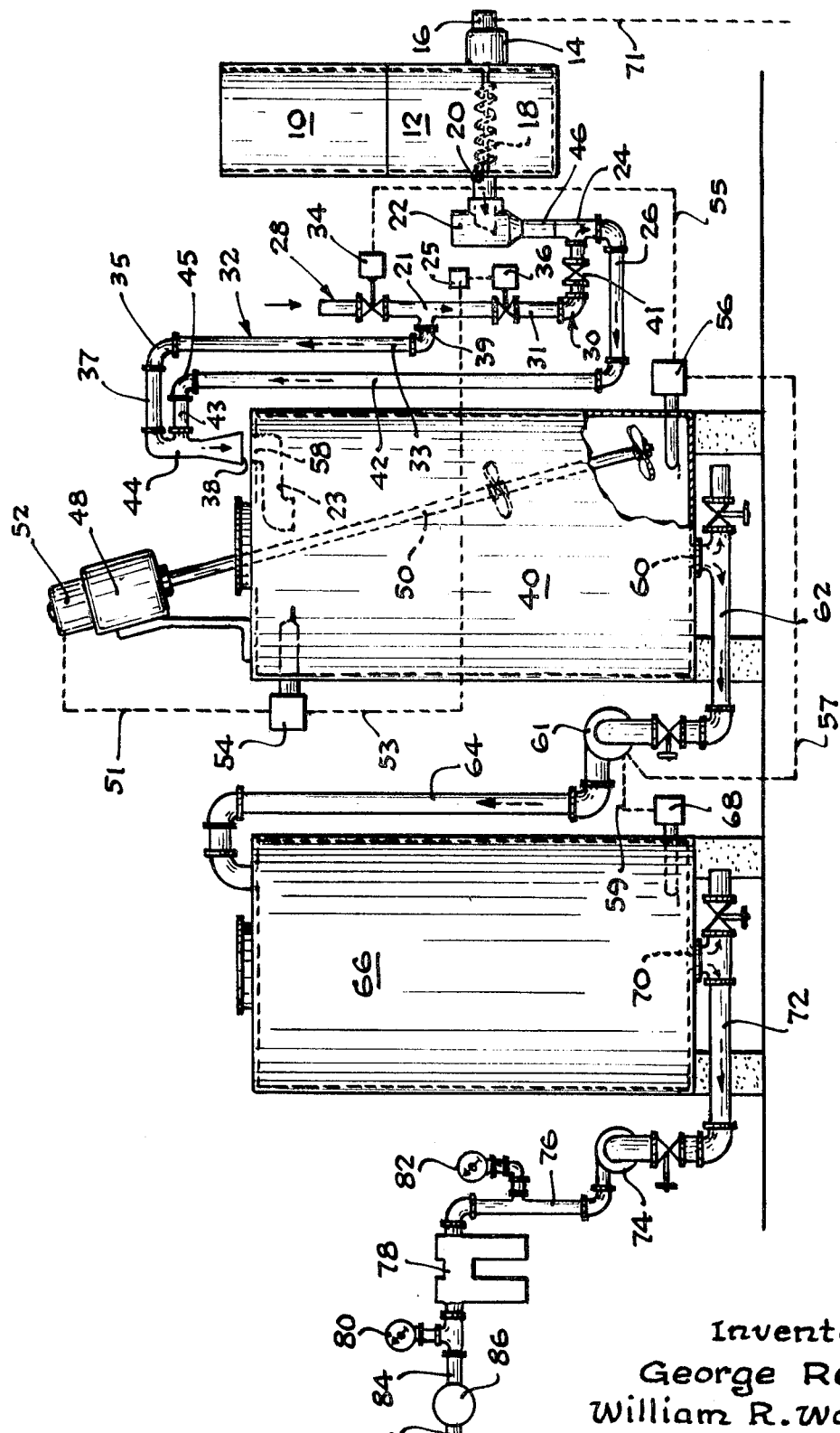
Inventors
George Reid
William R. Watson
By Johnston, Root, O'Keeffe,
Keil, Thompson & Shurtleff.
Attorneys

AUTOMATIC SOLVENT ASPIRATED POWDER FEEDER-DISSOLVER

INTRODUCTION

This invention is directed to a continuous method of dissolving chemical powders in water to make lump-free solutions. By chemical powders as defined in this invention is meant to include granules, flakes, grains, pellets and any other form in which dry powders could exist. It is also directed to an apparatus for carrying out the method thus described.

Many chemical powders such as water-soluble polymers tend to form lumps upon being wetted. Presently, about the only way that some chemical solutions can be made up is by merely throwing the chemical powder into a tank while mixing. This is a slow and tedious process. Without adequate mixing, the powders form lumps which are extremely hard to disperse. Great benefits would be achieved if such water dispersions could be created by an efficient process and apparatus.

If it were possible to produce solutions of the chemical powders without forming lumps this would be a great advantage to the art. If these solutions could be produced by a continuous process it would likewise be a great advantage. If a device could be used that would allow thorough mixing of the chemical powder without overmixing and without forming lumps the use of chemical powders could be facilitated.

OBJECTS OF THE INVENTION

Based on the above considerations, it therefore becomes an object of this invention to provide an improved apparatus and method for dissolving chemical powders in water to form lump-free solutions.

Another object of the invention is to provide a continuous method for dissolving chemical powders in water.

Another object is to provide an apparatus for dissolving these powders in water solutions continuously.

Other objects will appear hereinafter.

THE DRAWING

For a better understanding of the invention, reference may be had to the drawing which gives a schematic view of the apparatus used in the practice of the invention.

THE APPARATUS

With specific reference to the drawing there is provided a bag hopper 10 which holds the bag of the dry chemical powder and is positioned over a feeder 12 having a motor 14 and a timer 16. The motor controls the screw feeder 18 which extends through an outlet 20. The outlet 20 is fitted into a powder funnel 22 which is connected by line 46 to an aspirator 24.

A water supply port 28 comprises a suction assembly 30 and a supply assembly 32. The aspirator 24 is part of the suction assembly 30. The suction assembly 30 comprises an aspirator 24, a U-shaped line 26, a vertical line 42, an elbow 45 and a horizontal line 43. An L-shaped line 31 is connected to line 21 of the supply assembly 32 and to the aspirator 24. At the juncture of L-shaped line 31 and aspirator 24 is a flow control valve 41. The aspirator 24 is also connected to the U-shaped line 26, which is connected to the vertical line 42. The vertical line 42 is connected to the elbow 45, which is connected to the horizontal line 43. The horizontal line 43 is connected to an aspirator 44.

The water supply port 28 has a suction assembly 30, previously described, and a supply assembly 32. The supply assembly 32 comprises an L-shaped line 31, a T-shaped line 21, an L-shpaed line 33, and elbow 35 and a horizontal line 37. The T-shaped line 21 is connected to a water supply and to the L-shaped line 31. The delayed actuated valve 36 is positioned at the juncture of the T-shaped line 21 and the L-shaped line 31. The L-shaped line 33 is connected to the T-shaped line 21 and is also connected to the elbow 35. The elbow 35 is connected to the horizontal line 37 which is connected to the aspirator 44.

An automatic valve 34 is positioned in the T-shaped line 21 of the supply assembly 32. The delayed actuated automatic valve 36 is also positioned between the L-shaped line 31 of the supply assembly 32 and the T-shaped line 21. The L-shaped line 33 is connected to the T-shaped line 21 at a junction 39 between the automatic valve 34 and the delayed actuated automatic valve 36.

Water flows into the water supply port 28 through the automatic valve 34 when it is opened and into the supply assembly 32 and out of the outlet 38 and into the inlet 58 of the mixing tank 40. Preferably outlet 38 has an elbow 23 which assures greater mixing.

When water is flowing through the water supply port 28 and through the supply assembly 32 the delayed actuated automatic valve 36 is closed. A suction is created in the suction assembly 30. Aspirator 44 creates this suction. When the suction is created by aspirator 44, the delayed actuated valve 36 is opened by a rely 25 and the water will flow through the suction assembly, into the aspirator 44, out the outlet 38 and into the mixing tank 40. When the water is flowing through the suction assembly 30 and through the aspirator 24 a suction is created in vertical line 46 and in the powder funnel 22. When the screw feeder 18 is actuated by the motor 14, the dry powder is fed into the powder funnel 22 and drawn by the suction into vertical line 46 through the aspirator 24 to be mixed with the water flowing through the suction assembly 30 to be discharged into the mixing tank 40. The lower liquid level sensing means 56 of the mixing tank 40 opens the automatic valve 34 by means of electrical line 55. The lower liquid level sensing means 56 also deactivates the transfer pump 61 by means of the electrical line 57.

The mixing tank 40 is fitted with a mixing means which, as shown in the drawing, is a motor 48 driven propeller 50 having a timer 52. The mixing tank 40 is also fitted with an upper liquid level sensing means 54 which actuates the timer 52 on the motor 48 by means of an electrical line 51. The upper liquid-level-sensing means 54 also closes automatic valve 34 and delayed actuated automatic valve 36 by means of electrical line 53, when the liquid level reaches the upper liquid level sensing means 54.

The mixing tank has an inlet 58 adapted to receive said outlet 38 of said aspirator 44. Preferably, outlet 38 has an elbow 23 to assure greater mixing. The mixing tank also has an outlet 60 for the discharge of the mixed chemical solution. The discharged solution passes through connecting line 62 past the transfer pump 61 through line 64 and into the storage tank 66. The storage tank 66 is fitted with a lower liquid-level-sensing means 68. When the liquid level gets below the lower liquid-level-sensing means 68, pump 61 is actuated by means of line 59 so that the chemical solution is transferred from the mixing tank 40 to the storage tank 66. The storage tank 66 has an outlet 70 and a line 72 to a metering pump 74 for the discharge of the chemical solution. Metering pump 74 is deenergized manually when it is desired to turn off the chemical solution. Preferably, the metering pump 74 also has a line 76 to a dual filter 78 which has pressure gages 80 and 82 positioned on each side of the dual filter 78 to judge the pressure drop across the filter. There is also a line 84 from the dual filter 78 to a flow meter 86 to measure the discharge of said chemical solution from the dual filter 78 to a discharge 88.

OPERATION OF THE APPARATUS

In use, the water supply port 28 is attached to a water supply. The water flows through the water supply port 28 through suction assembly 30 to the closed delayed actuated automatic value 36. The water is thus forced through the supply assembly 32 into the aspirator 44, out the outlet 38 and into the inlet 58 of the mixing tank 40. A suction is created in the suction assembly 30 and the delayed actuated automatic valve 36 is opened so that the water is then flowing through the supply assembly 32 and the suction assembly 30 of the water supply port 28. The flow control valve 41 regulates the amount of water flowing through the suction assembly 30. A suction is created in vertical line 46 by the aspirator 24 and aspirator 44 so that when the powder is fed by the screw feeder 18, the chemical powder is drawn through the powder funnel 22 into line 46 into the aspirator 24 to be premixed to form a slurry. The screw feeder 18 is actuated by the motor 14 which is controlled by timer 16 which is controlled by electrical line 71 to a source of electrical power. As the powder is drawn into the aspirator 24 it is mixed with water and delivered to the aspirator 44 into the outlet 38 fitted into the inlet 58 of the mixing tank 40. As the mixing tank fills up, the propeller 50 is agitating the chemical and the water to make a chemical solution. At a predetermined time, the chemical feeder is turned off, before the liquid level reaches the upper liquid-level-sensing means 54. When the liquid level contacts the upper liquid-level-sensing means 54 the delayed actuated automatic valve 36 and the automatic valve 34 are closed shutting off the water flow.

Also when the liquid level contacts the upper liquid-level-sensing means 54, the timer 52 on the motor 48 of the propeller 50 is actuated by means of the electrical line 51. The propeller 50 thus assures complete mixing of the chemical slurry and the water to make a chemical solution without overmixing.

The lower liquid-level-sensing means 56 of the mixing tank 40 opens the automatic valve 34 by means of electrical line 55.

When the lower liquid-level-sensing means 68 of the storage tank 66 actuates the transfer pump 61, the chemical solution is discharged through the outlet 60 through the connecting line 62 past the transfer pump 61 into line 64 into the storage tank 66. When the liquid level in the mixing tank 40 falls below the lower liquid-level-sensing means 56 the transfer pump 61 is deactuated by lower liquid-level-sensing means 56 by means of electrical line 57. The chemical solution in the storage tank is fed through the outlet 70 through line 72 past the metering pump 74 through line 76. The line 76 may be fitted with a filter 78, preferably a dual filter. The dual filter 78 allows one filter to be cleaned while the other is being used.

Pressure gages 80 and 82 determine the pressure drop across the filter. The chemical solution after being filtered is passed to line 84 through a flow meter 86 through a discharge 88.

While the apparatus and methods described are directed to dissolving chemical powders in water to make lump-free solutions, it can readily be seen that the same techniques and apparatus may be used for making solutions of any chemical powders.

SUMMARY

In summary, an apparatus and a method for making water solutions of chemical powders is disclosed whereby powders that tend to form lumps upon wetting can be easily dispersed in water to form chemical solutions. This is a continuous process and after supplying a source of water and electricity, the equipment can run automatically to supply a chemical solution.

The invention is hereby claimed:
1. An automatic chemical feeder for dissolving chemical powders in water to form lump-free solutions which comprises:
  A. a powder tank having:
    1. a powder outlet port,
    2. a powder transport conduit connected at one end to said outlet port and at the other end to an inlet to a mixing tank,
    3. powder feed means to said outlet port,
  B. a water supply port, comprising:
    1. a water supply assembly having three ends, with one end attached to a water supply,
    2. a suction assembly in said powder transport conduit adjacent said powder outlet port and attached to another end of said water supply assembly,
    3. a suction aspirator fitted in said suction assembly,
    4. a supply assembly in said powder transport conduit adjacent said inlet to said mixing tank and attached to the remaining end of said water supply assembly,
    5. a supply aspirator fitted in said supply assembly,
    6. an automatic valve positioned in the water supply port and
    7. a delay actuated automatic valve positioned between said water supply assembly and the suction assembly;
  C. a mixing tank capable of holding a chemical solution, including:
    1. a mixing means for said tank,
    2. an upper liquid-level-sensing means to close said automatic valve and said delayed-actuated automatic valve,
    3. a lower liquid-level-sensing means to open said automatic valve and said delayed-actuated automatic valve,
    4. said inlet being adapted to discharge material conveyed through said transport conduit into said mixing tank,
    5. an outlet;
    6. a solution transport conduit connecting said outlet to a storage tank.
  D. a transfer pump in said solution transport conduit to remove said chemical solution from said mixing tank through said outlet and deenergized by said lower liquid-level-sensing means of said mixing tank;
  E. a storage tank adapted to receive said chemical solution from said solution transport conduit, having a lower liquid-level-sensing means to actuate said transfer pump and having an outlet; and
  F. a conduit attached to said outlet and having a metering pump therein, said metering pump being deenergized manually and having an outlet for discharge of said chemical solution.
2. The automatic chemical feeder of claim 1 including a filter adapted to receive said chemical solution from said outlet of said metering pump and having a discharge for said chemical solution.
3. The automatic chemical feeder of claim 2 where the filter is a dual filter and including a flow meter adapted to measure said discharge of said chemical solution from said filter.
4. The automatic chemical feeder of claim 3 including a control valve positioned in the suction assembly of the water supply port.